(12) United States Patent
Yamano et al.

(10) Patent No.: US 6,749,102 B2
(45) Date of Patent: Jun. 15, 2004

(54) ULTRASONIC WELDING AND CUTTING DEVICE FOR USE IN THE MANUFACTURE OF A FLAT CABLE

(75) Inventors: Yoshiaki Yamano, Yokkaichi (JP); Koji Fukumoto, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 135 days.

(21) Appl. No.: 10/175,060

(22) Filed: Jun. 20, 2002

(65) Prior Publication Data

US 2002/0195478 A1 Dec. 26, 2002

(30) Foreign Application Priority Data

Jun. 21, 2001 (JP) ........................................ 2001-187750

(51) Int. Cl.[7] ...................... B23K 20/10; B23K 31/10; B23B 31/18
(52) U.S. Cl. ...................... 228/110.1; 228/1.1; 228/160; 156/73.3; 156/580.2
(58) Field of Search ................................ 228/1.1, 110.1, 228/159, 160; 156/73.1, 73.2, 73.3, 73.4, 73.6, 580.1, 580.2

(56) References Cited

U.S. PATENT DOCUMENTS

| | | | | |
|---|---|---|---|---|
| 3,852,144 A | * | 12/1974 | Parry | 156/510 |
| 4,227,959 A | * | 10/1980 | Brown | 156/515 |
| 4,410,383 A | * | 10/1983 | Lipari | 156/73.1 |
| 4,623,420 A | * | 11/1986 | Hinkley | 156/515 |
| 4,690,722 A | * | 9/1987 | Flood | 156/510 |
| 6,026,563 A | | 2/2000 | Schilson | |
| 6,165,298 A | * | 12/2000 | Samida et al. | 156/73.1 |

FOREIGN PATENT DOCUMENTS

| | | |
|---|---|---|
| GB | 2356970 | 6/2001 |
| JP | 09259662 | 10/1997 |

OTHER PUBLICATIONS

English Language Abstract for JP Appln. No. 09-259662.

* cited by examiner

Primary Examiner—M. Alexandra Elve
Assistant Examiner—Kevin McHenry
(74) Attorney, Agent, or Firm—Greenblum & Bernstein, P.L.C.

(57) ABSTRACT

The invention relates to an ultrasonic welding and cutting device for use in the manufacture of a flat-cable. The flat cable includes a plurality of wire conductors which are arranged in parallel at a given interval with respect to each other and interposed between first and second insulator films. The device has a product flow line in an upstream to downstream direction. The device comprises a horn unit including a horn melter unit that imparts ultrasonic oscillations, and a horn cutter unit. The horn melter unit and the horn cutter unit are located sequentially from upstream to downstream at a predetermined distance along the product flow line. The device further includes an anvil unit including an anvil melter unit and at least one anvil blade unit. The anvil melter unit and the at least one anvil blade unit respectively face the horn melter unit and the horn cutter unit along the product flow line, such that, when the first and second insulator films containing the plurality of wire conductors are passed between the horn and anvil units, the first and second insulator films can be fused and adhered by the horn and anvil melter units, and successively fused and cut or trimmed by the horn cutter unit and the at least one anvil blade unit, respectively along the product flow line.

11 Claims, 6 Drawing Sheets

ULTRASONIC WELDING AND CUTTING DEVICE FOR USE IN THE MANUFACTURE OF A FLAT CABLE

BACKGROUND OF THE INVENTION

1. Field of the Invention

The present invention relates to a flat cable manufacturing device, in which a plurality of wire conductors are arranged in parallel at a given interval from each other, and are enclosed by a pair of insulator films.

2. Description of Background Information

Such a flat cable exists in the prior art and is known to have the advantages of requiring less space and reducing the total weight per conductor capacity, compared to individual wires. The above insulator films is formed of e.g. a polyester-based material, in which a good insulator material, e.g. polyethylene terephthalate (PET), is used as a base portion, one of its faces being coated with an adhesion layer made of a thermoplastic material, for instance.

FIG. 1 shows an example of known methods for manufacturing such flat cables. The base portion of the insulator films 1 and 2 is made of PET or the like. The adhesion layer is heat-fusible material having a thickness of e.g. 40 μm provided on one surface of the base portion. The insulator films 1 and 2 are superposed on a plurality of regularly arranged wire conductors 3 with the adhesion layers facing each other. The films are then passed between hot pressure rolls 4, 5 for hot-press adhesion. The adhesion layers are thereby melted, causing the insulator films 1, 2 to be adhered to each other.

Note that for the insulator films to be adhered properly, the above method requires that the adhesion layers be melted down by conducting heat right through their thickness. For a good adhesion, the adhesion layers must be melted down thoroughly. This often leads to a relatively long transformation time and a low productivity.

Furthermore, when the adhesion layers are not sufficiently thick, the insulator films 1 and 2 cannot be adequately adhered to the wire conductors 3. However, if the adhesion layers are thick, the insulator films 1 and 2 cannot be separated easily from the wire conductors 3. This creates problems when recycling disused cables. In addition, the material forming the adhesion layer may be contaminated with the insulator films 1 and 2, tending to make recycling inefficient.

To avoid such problems, there had been proposed insulator films having no adhesion layer coating. Alternatively, as is disclosed in JP-A-Hei-9-259 662, the base portion material and adhesion layer (1 to 3 μm thick) of the insulator film can be formed of the same type of material, and adhered by ultrasonic welding.

One such method is shown in FIG. 2. According to this method, two insulator films 11 and 12 are prepared, each having a thin adhesion layer on one surface. They are respectively stored coiled respectively around a top film roll 13 and a bottom film roll 14, such that upon being uncoiled in the manufacturing process, the adhesion layers are mutually superposed. Upon being unrolled from the above-mentioned top and bottom film rolls 13 and 14, the insulator films 11, 12 are supplied to a pair of hot rolls 15 and 16 for press adhesion at 170° C. At the same time, a plurality of wire conductors 20 are uncoiled from corresponding conductor supply rolls 17 and forwarded to a pair of pitch guides 18 and 19, causing the wire conductors 20 to be arranged in parallel at a given pitch relative to each other. The wire conductors 20 and the pair of insulator films 11 and 12 are then supplied synchronously to the hot rolls 15 and 16, such that the wire conductors 20 are interposed between the adhesion layers of the insulator films 11 and 12.

There is further provided an ultrasonic welding machine 21 comprising a horn 22 and an anvil 23. At least one of the horn 22 and anvil 23 includes a plurality of surface grooves corresponding to the passages for the wire conductors 20, such that the surface of at least one of the horn or anvil forms an alternating protrusion-and-recess profiled cross-section. The horn 22 and the anvil 23 hold the insulator films 11 and 12 by the interval areas, or spaces, between the passages for the wire conductors 20. The horn 22 is then supplied to ultrasonic energy, so that those interval areas of the insulator films 11, 12 held by the horn 22 and anvil 23 are heat-melted. The melted portions are cooled and solidified by a cooling unit, e.g. cold-air jetting.

Thereafter, the two longitudinal rim portions of the insulator films 11 and 12 are trimmed by a pair of side cutters 24. The heat-welded insulator films 11 and 12 are then forwarded further by intermittent drive motion generated by a pair of stepping rollers 26 and 27 which is linked to a stepping motor. The insulator films 11 and 12 are passed through a guide roller 28 and coiled around a coiling roll 29.

According to such a flat cable manufacturing method, the longitudinal rim portions (longitudinal edges) of the welded insulator films 11 and 12 must be suitably regulated such as to yield a constant width. The ultrasonic welding machine 21 and the side-cutter 24 must also be appropriately distanced, so that the hot welded insulator films 11 and 12 are sufficiently cooled down before they are cut off by the side-cutters 24.

However, the above-mentioned distance between the welding machine and the cutter tends to allow the insulator films 11 and 12 to deviate in the width direction during the forwarding, so that the cutting margins in the width direction fluctuate constantly.

Further, when both of the longitudinal rim portions are not sufficiently cooled down while cutting-off, the insulator films 11 and 12 tend to droop. In such a case, a high-speed flat cable production is rendered virtually impossible.

SUMMARY OF THE INVENTION

The present invention therefore aims to provide a flat-cable manufacturing device, which is capable of cutting the longitudinal rim portions (longitudinal edges) of the insulator films with high precision and at a high speed.

To this end, there is provided an ultrasonic welding and cutting device for use in the manufacture of a flat-cable, the flat cable including a plurality of wire conductors which are arranged in parallel at a given interval to each other and interposed between first and second insulator films, the device having a product flow line in an upstream to downstream direction, and including a horn unit that imparts ultrasonic oscillations, the horn unit including a horn melter unit, and a horn cutter unit, the horn melter unit and the horn cutter unit being located sequentially from upstream to downstream at a predetermined distance along the product flow line; and an anvil unit including an anvil melter unit and one or several anvil blade unit(s), the anvil melter unit and the anvil blade unit(s) respectively facing the horn melter unit and the cutter unit along the product flow line;

such that, when the first and second insulator films containing the plurality of wire conductors are passed between the horn and anvil unit, the first and second insulator films can be fused and adhered by the horn and anvil melter units, and successively fused and cut or trimmed by the horn cutter unit and anvil blade unit(s), respectively along the product flow line.

Preferably, the anvil melter unit and horn melter unit have respective surfaces facing each other, and at least one of the surfaces includes a plurality of conductor-path grooves formed correspondingly to the plurality of wire conductors, such that, when the horn melter unit is moved toward to the anvil melter unit, the wire conductors are placed in the conductor-path grooves, and such that, while an upstream portion of the first and second insulator films is ultrasonically fused and welded, the horn cutter unit and the anvil blade unit are placed into contact and a downstream portion of ultrasonically welded first and second insulator films is ultrasonically cut off.

The anvil melter unit may have a cylindrical form with a circular surface, and the conductor-path grooves may be formed on the circular surface.

Preferably, the device further includes an anvil cylinder unit having grooves, which has the same configuration as that of the anvil melter unit and is placed downstream the anvil blade unit(s) along the product flow line.

Preferably yet, each of the anvil blade unit(s) has a configuration such that it can be freely fitted into, or removed from, the space formed between a conductor-path groove of the anvil melter unit and the corresponding groove of the anvil cylinder unit, and held therebetween.

Typically, the horn melter unit has an arc-shaped form projecting towards the anvil melter unit.

Further, the horn cutter unit may have a surface facing the anvil blade unit, and the surface may be provided with ceramic chips.

Suitably, the device further includes a regulating mechanism that regulates a contact pressure of the anvil blade unit against the horn cutter unit.

The invention further relates to a system for manufacturing a flat cable, the system having a product flow line in an upstream to downstream direction, and including mechanism for arranging a plurality of wire conductors in parallel at a given interval to each other; mechanism for interposing the wire conductors between first and second insulator films; such that the first and second insulator films face each other at the given interval between the wire conductors; and an ultrasonic welding and cutting unit including a horn unit for imparting ultrasonic oscillations comprising a horn melter unit and a horn cutter unit, the horn melter unit and the horn cutter unit being located sequentially from upstream to downstream at a predetermined distance along the product flow line; and an anvil unit including an anvil melter unit and one or several anvil blade unit(s), the anvil melter unit and the anvil blade unit(s) respectively facing the horn melter unit and the horn cutter unit along the product flow line; such that, when the first and second insulator films containing the plurality of wire conductors are passed between the horn and anvil units, the first and second insulator films can be fused and adhered by the horn and anvil melter units, and successively fused and cut or trimmed by the horn cutter unit and anvil blade unit, respectively along the product flow line.

Preferably, the system further includes mechanism for providing adhesion layers to the first and second insulator films upstream of the ultrasonic welding and cutting mechanism, the adhesion layers being supplied on the surface of each of the first and second insulator films which faces the wire conductors.

The invention also concerns a method for manufacturing a flat cable having a product flow line in an upstream to downstream direction, and includes arranging a plurality of wire conductors in parallel at a given interval to each other; interposing the wire conductors between first and second insulator films; whereby the first and second insulator films face each other at the given interval between the wire conductors; and ultrasonically welding and cutting by using: a horn unit that imparts ultrasonic oscillations, the horn unit including a horn melter unit and a horn cutter unit, the horn melter unit and the horn cutter unit being located sequentially from upstream to downstream at a predetermined distance along the product flow line; and an anvil unit comprising an anvil melter unit and one or several anvil blade unit(s), the anvil melter unit and the anvil blade unit(s) respectively facing the horn melter unit and the horn cutter unit along the product flow line; whereby, when the first and second insulator films containing the plurality of wire conductors are passed between the horn and anvil units, the first and second insulator films can be fused and adhered by the horn and anvil melter units, and successively fused and cut or trimmed by the horn cutter unit and the anvil blade unit, respectively along the product flow line.

BRIEF DESCRIPTION OF THE DRAWINGS

The above, and the other objects, features and advantages of the present invention will be made apparent from the following description of the preferred embodiments, given as non-limiting examples, with reference to the accompanying drawings, in which.

DETAILED DESCRIPTION OF THE PREFERRED EMBODIMENTS

Figure 1:
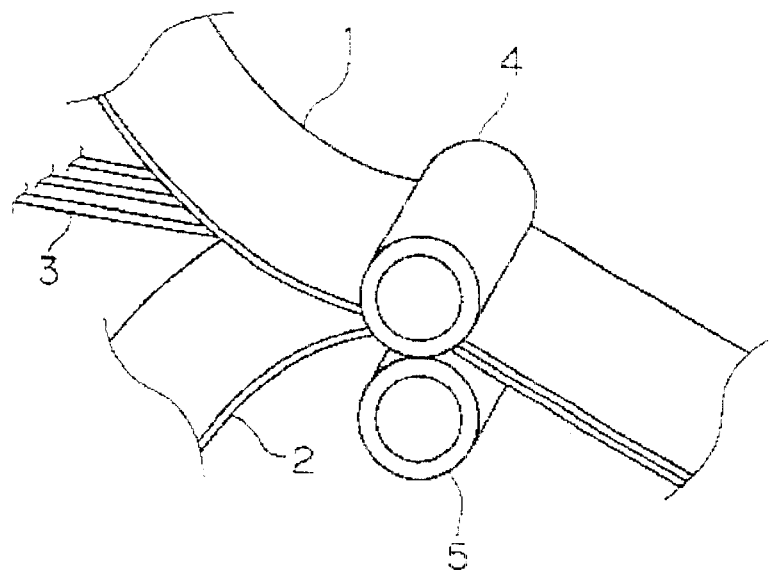
FIG. 1 schematically shows the technical principles of a flat-cable manufacturing device known in the prior art.
Figure 2:
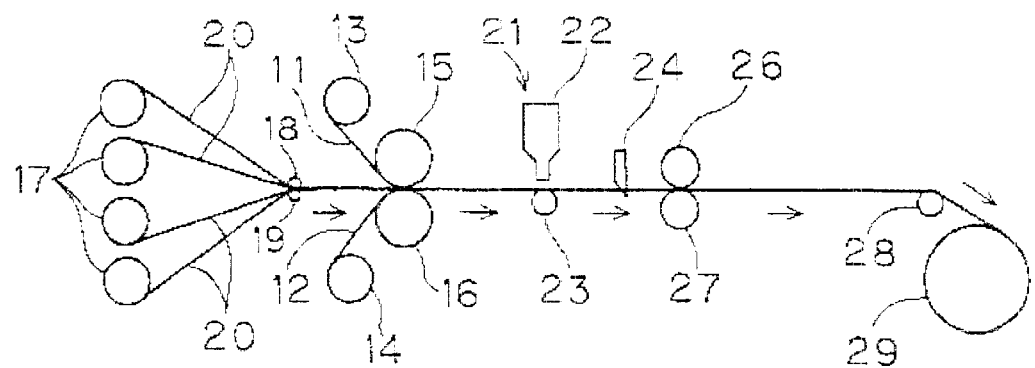
FIG. 2 shows a production flow diagram for manufacturing a flat cable known in the prior art.
Figure 3:
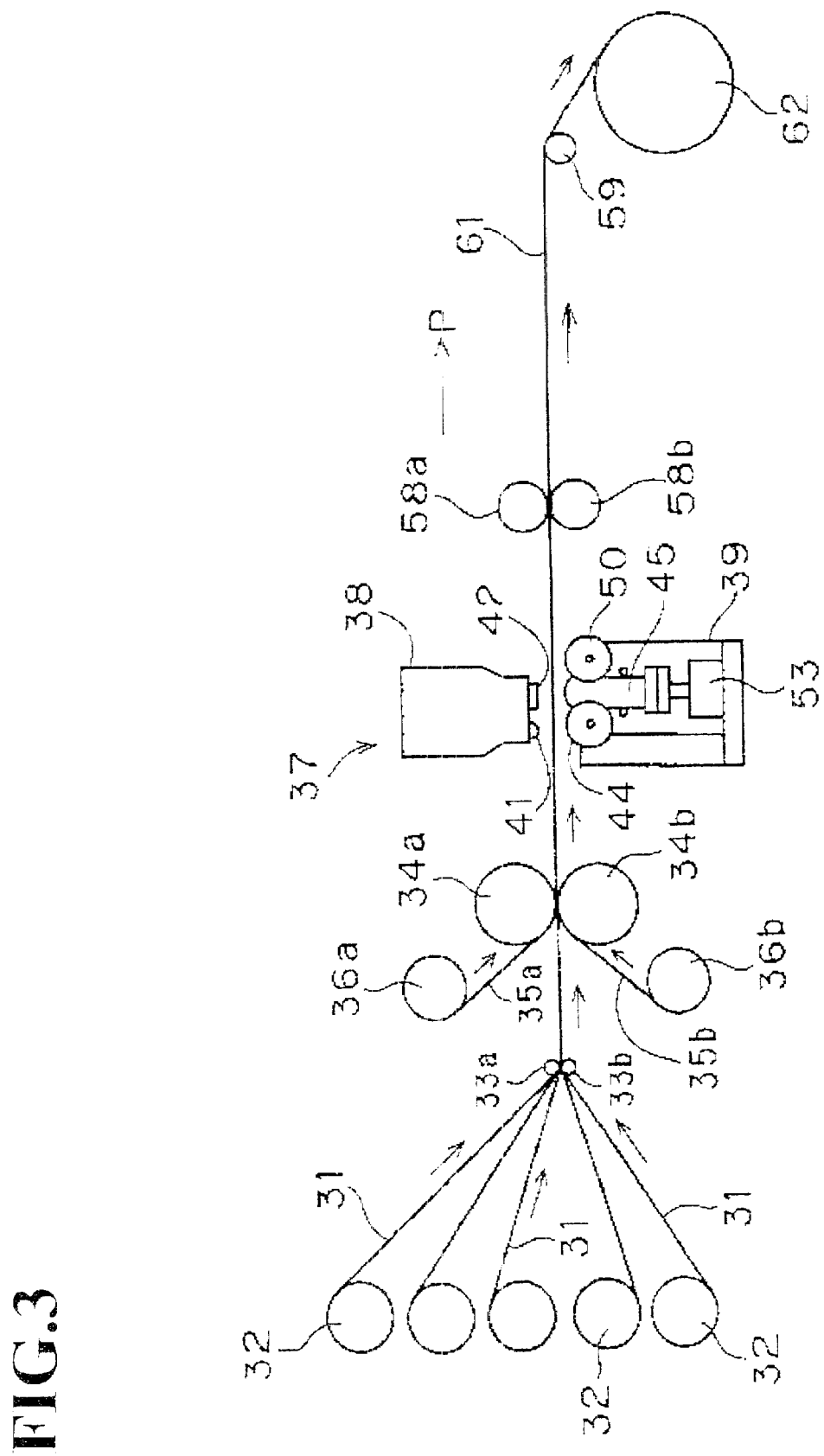
FIG. 3 shows a production flow diagram for manufacturing a flat-cable, in which an ultrasonic welding and cutting device according to the invention is applied.

FIG. 3 schematically shows a flat-cable manufacturing process flow, in which an ultrasonic welding and cutting device of the invention is installed. There is first provided a plurality of conductor-supplying rolls 32 at the most upstream end of the product flow line P. The wire conductors 31 are stored around these rolls 32. Downstream of the conductor-supplying rolls 32 are provided a pair of pitch guides 33a, 33b that guide and arrange the wire conductors 31 in parallel at a given interval to each other.

The conductor-supplying rolls 32 are initially coiled with a respective wire conductor made of copper or a copper alloy. The number of wire conductors corresponds to that of the conductor elements to be incorporated into a flat cable. In the illustrated embodiment, five wire conductors 31 are employed and stored around the corresponding number of conductor-supplying rolls 32. Each wire conductor 31 may be, for instance, a soft copper wire having a rectangular cross-section. The cross-section has e.g. a thickness of about 0.15 mm and a width of about 1.5 mm. The wire conductors 31 may be arranged at an interval of about 2.5 mm to each other.

Further downstream are provided top and bottom hot rolls 34a and 34b, respectively flanking the product flow line P from the above and from the below. At the supply side of them are provided top and bottom film rolls 36a and 36b, which supply the insulator films 35a and 35b towards the top and bottom hot rolls 34a and 34b, such that the insulator films 35a and 35b are placed respectively on the upper and lower sides of the wire conductors 31.

The top and bottom film rolls 36a and 36b are initially wound with the insulator films 35a, 35b respectively. Each insulator film 35a or 35b is formed of a flexible and ultrasonically weldable resin film. The resin film may be composed, for instance, of a base film made of 100 mm-thick PET, and a 1 $\mu$m-thick adhesion layer made of polyester and adhered on one surface of the base film. The insulator films 35a and 35b are supplied to the top and bottom hot rolls 34a and 34b, such that each adhesion layer faces the wire conductors 31.

Figure 4:
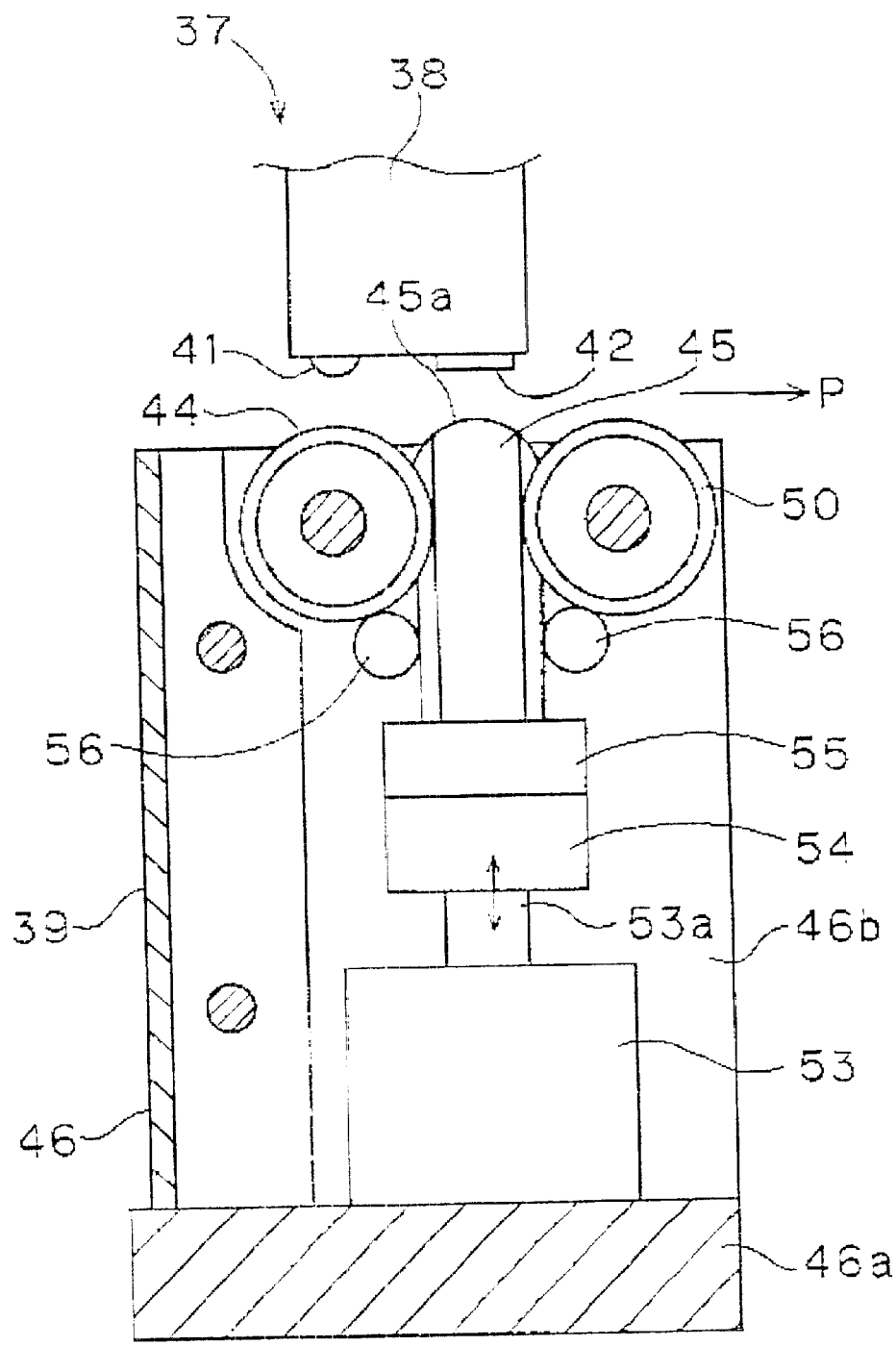
FIG. 4 is an enlarged side view depicting the functional principles of the ultrasonic welding and cutting device according to the invention.
Figure 5:
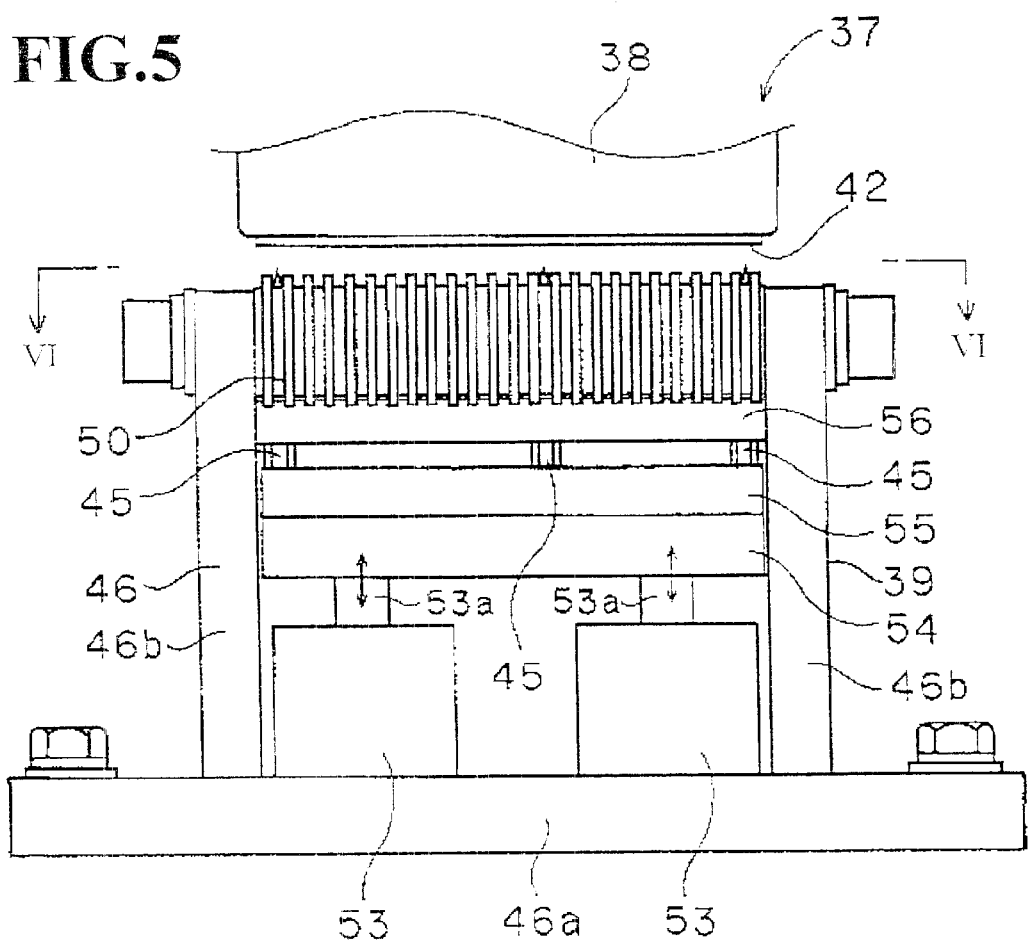
FIG. 5 is a partial cross-sectional view of the device of FIG. 4, taken along an axial direction of the production flow diagram.

Further downstream is provided an ultrasonic welding and cutting device 37. As shown in FIGS. 3 and 4, the ultrasonic welding and cutting device 37 includes a horn unit 38 and an anvil unit 39, which are mounted, respectively, above and below the product flow line P. The horn unit 38 produces ultrasonic oscillations. The horn unit 38 and the anvil unit 39 can move closer to or away from each other in the direction perpendicular to the product flow line P.

The horn unit 38 includes a horn melter (i.e. melting) unit 41 and a horn cutter unit 42, which are provided at the horn's bottom side facing the anvil unit 39. Further, the horn melter unit 41 is placed upstream of the horn cutter unit 42 at a given distance along the product flow line P.

As shown in FIG. 4, the horn melter unit 41 is in the form of an arc projecting towards the anvil unit 39, when viewed from a side of the product flow line P.

As also shown in FIG. 4, the horn cutter unit 42 has a flat surface turned towards the anvil unit 39, when viewed from a side of the product flow line P. The flat surface is embedded or adhered with ceramic chips.

The anvil unit 39 includes an anvil melter unit 44 and an anvil blade unit 45, respectively facing the corresponding horn melter unit 41 and horn cutter unit 42. The anvil melter unit 44 and the anvil blade unit 45 are mounted on a supporting stand 46 including two side panels 46b.

The anvil melter unit 44 is in the form of a cylinder freely rotatable around an spindle. The spindle is supported by the two side panels 46b of the supporting stand 46 along the direction perpendicular to the production line P.

As shown in FIGS. 5 to 8, the external circular surface of the anvil melter unit 44 is provided with a plurality of conductor-path grooves 49, which form corresponding conductor-passage spaces 48 (FIG. 8) arranged at the same pitch as that of the wire conductors 31. Accordingly, when the horn melter unit 41 approaches the anvil melter unit 44, the wire conductors 31 are lodged in the corresponding conductor-passage spaces 48. Typically, the external circular rims of each conductor-path groove 49 are enlarged outwardly in the radial direction, so that the wire conductors 31 can be easily lodged in the groove 49.

The support stand 46 contains an anvil cylinder unit 50 that has the same structure as the anvil melter unit 44. Accordingly, the anvil cylinder unit 50 is grooved, includes a spindle supported by the side panels 46b, and can be freely rotated around this spindle. The anvil cylinder unit 50 is then placed parallel to the anvil melter unit 44, and positioned downstream of the anvil blade unit 45 along the product flow line P.

Figure 6:
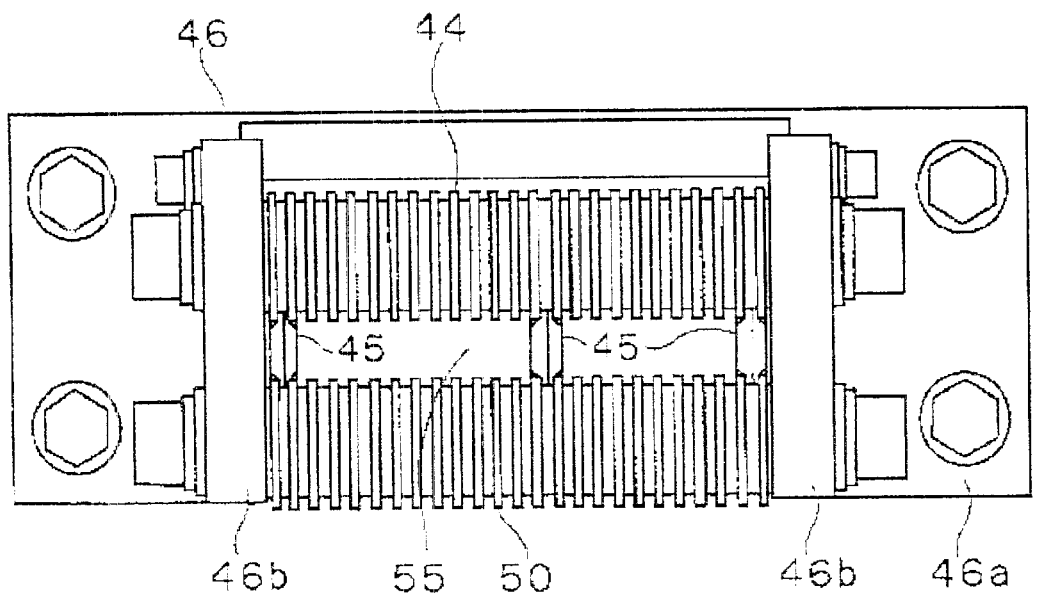
FIG. 6 is a top plan view of the anvil unit of the device of FIG. 5, taken along line VI—VI in FIG. 5.
Figure 7:
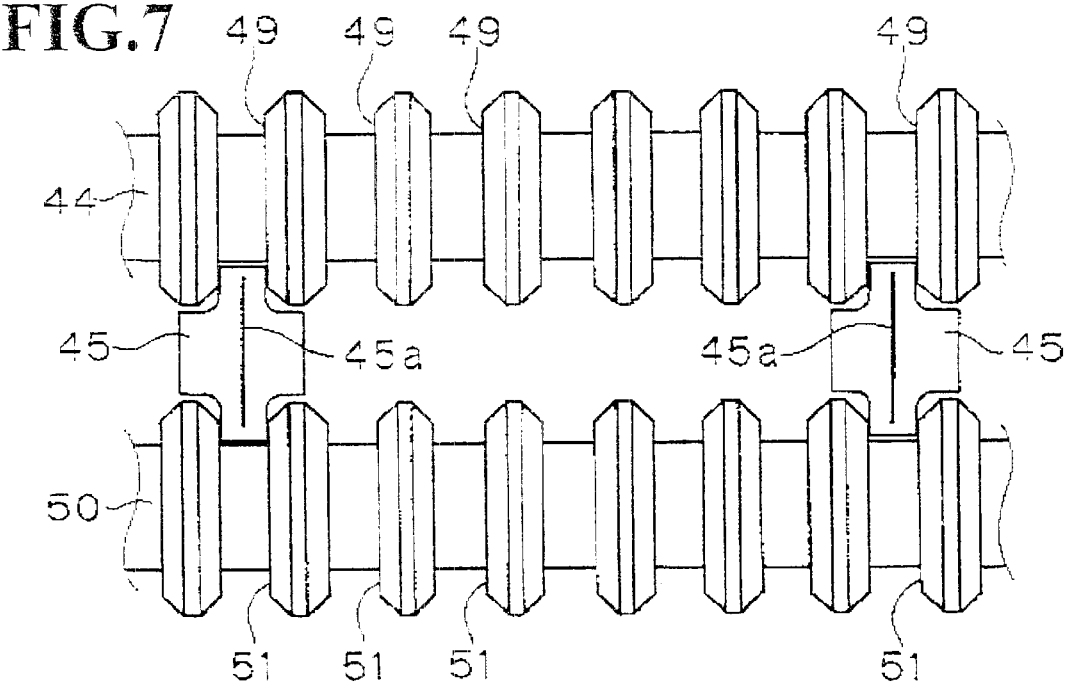
FIG. 7 is an enlarged view of the main part of the anvil unit of the device of FIG. 6.
Figure 8:
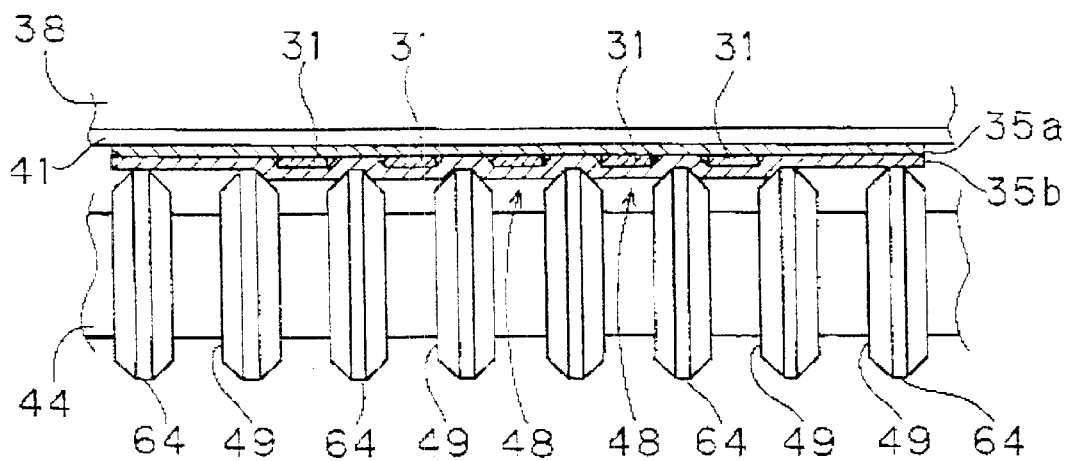
FIG. 8 is a partial view of the main part of FIG. 7, when the insulator films are loaded between the horn unit and the anvil unit of the device according to the invention.

As shown in FIGS. 6 and 7, the anvil blade unit 45 is mounted or removed freely from the top side of the product flow line P, between the conductor-path grooves 49 (of the anvil melter unit 44) and the grooves 51 (of the anvil cylinder unit 50), and positioned and held therebetween.

Further, the support stand 46 contains a base plate 46a, on which a pair of air cylinders 53 are installed as contact-pressure adjusting mechanism. The air cylinders 53 have respective rods 53a, which are linked to an anvil blade holder 54 (e.g. plate). The top surface of the anvil blade holder plate 54 is provided with a rubber body 55 of an appropriate thickness.

The anvil blade unit 45 can thus be mounted from the top side of the product flow line P, by passing between the conductor-path groove 49 and the groove 51, and can be settled on the rubber body 55.

As shown in FIG. 4, there are also provided a pair of slide guide rods 56, which have a circular cross-section and are placed under the anvil melter unit 44 and anvil cylinder unit 50. The slide guide rods 56 extend between the side panels 46b of the supporting stand 46, and guide the anvil blade unit 45 up and down by sliding motion.

The anvil blade holder 54 is moved up and down by to-and-from movements synchronized by the pair of air cylinders 53. These movements lift or descend the anvil blade unit 45, so that its height level can be adjusted. When the insulator films are to be ultrasonically cut off, the contact pressure against the horn cutting unit 42 is made optimal by adjusting the air pressure.

As shown in FIG. 4, the top of the anvil blade unit 45 is sharpened to form a blade tip 45a, which faces the horn cutting unit 42. The blade tip 45a projects in an arc shape, when viewed from a side of the product flow line P. The anvil blade units 45 may be arranged at suitable width positions of the insulator films 35a and 35b in an appropriate number.

Downstream of the ultrasonic welding and cutting device 37, top and bottom guide rollers 58a and 58b (or stepping rollers supra) are placed respectively above and below the product flow line P. Further downstream, there is provided a take-up roll 62 which receives the flat cable 61 produced via a second guide roller 59.

According to the system of the invention, the wire conductors 31, supplied from the conductor-supplying rolls 32, are arranged in parallel and at a predetermined interval to each other by the pitch guides 33a and 33b, and then supplied to the downstream hot rolls 34a and 34b. At the same time, the insulator films 35a and 35b are withdrawn from the respective film rolls 36a and 36b, and superposed respectively on the upper face and on the lower face of the wire conductors 31. The hot rolls 34a and 34b are heated to a temperature of e.g. 170° C. When the insulator films 35a and 35b are passed between them, the wire conductors 31 and the insulator films 35a and 35b are preliminarily adhered.

The latter are then introduced and held between the horn melter unit 41 and the anvil melter unit 44 (FIG. 8) of the ultrasonic welding and cutting device 37 located downstream, which is then put into motion.

Ultrasonic oscillations are generated by a generator system e.g. oscillator (not shown in the figures) and imparted to the horn unit 38, such that the horn melter unit 41, incorporated in the horn unit 38, is oscillated in the width direction of the insulator films 35a and 35b, thus generating ultrasonic oscillation energies. At this stage, the insulator films 35a and 35b are pressed by the circular ribs 64 located at both sides of each conductor-path groove 49. The insulator films 35a and 35b are then ultrasonically welded at both sides of each wire conductor 31 by the ultrasonic oscillation energies supra.

The ultrasonically welded insulator films 35a and 35b are then brought between the horn cutter unit 42 and anvil blade units 45 located downstream and melt-cut by ultrasounds, such that both longitudinal rims of the insulator films 35a and 35b keep a predetermined width margin.

In the embodiment shown in FIG. 7, the anvil blade units 45 are mounted at a predetermined interval to each other, so that they are placed between the conductor-path grooves 49 of the anvil melter unit 44, the conductor-path grooves 49 receiving a corresponding wire conductor 31.

Figure 9:
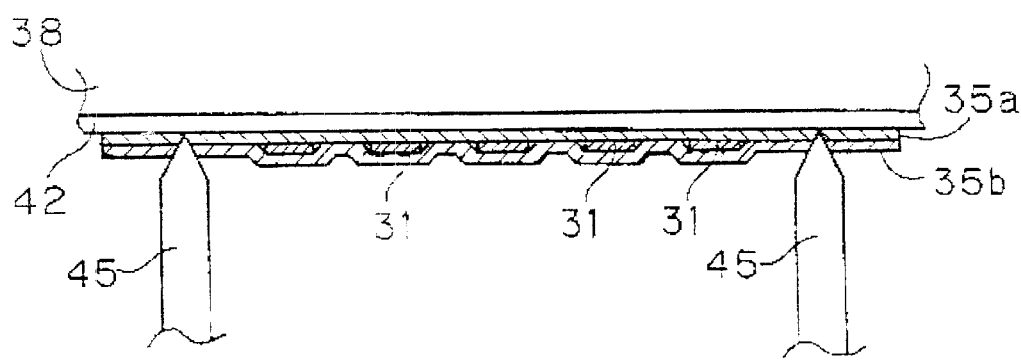
FIG. 9 is a view showing when the cutting mechanism are applied to the welded insulator films.
Figure 10:
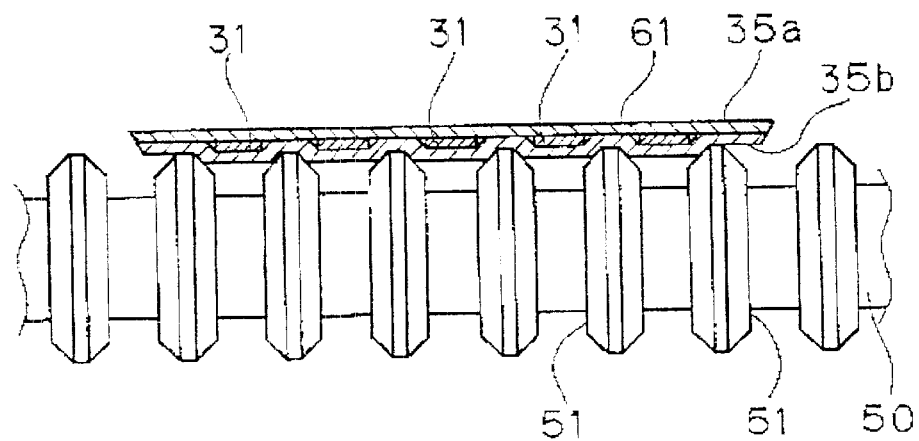
FIG. 10 is a view showing the insulator films after cutting.

As shown in FIG. 9, when the insulator films 35a and 35b are ultrasonically welded by the horn melter unit 41 and anvil melter unit 44, each anvil blade unit 45 is placed into contact with a corresponding horn cutter unit 42 under a given contact pressure. As in the case of the horn melter unit 41, the horn cutter unit 42, incorporated into the horn 38, is oscillated in the insulator-film's width direction. Both longitudinal rims of the insulator films 35a and 35b are then melt-cut by ultrasounds at given positions, by means of ultrasonic oscillation energies generated by the ultrasonic oscillations.

The wire conductors 31 and insulator films 35a and 35b are forwarded along the production line P by winding drive force exerted by the take-up roll 62. The anvil melter unit 44 is rotated by entrainment around the spindle which extends perpendicularly to the production line P. The bottom surface of the horn melter unit 44 rubs against the upper surface of the top insulator film 35a, while the circular ribs 64, each positioned between two conductor-path groves 49 of the anvil melter unit 44, are placed into contact with the lower surface of the bottom insulator film 35b by rotation. The insulator films 35a and 35b are continuously welded by ultrasounds along their length direction. Subsequently, they are continuously trimmed, with a given width margin being kept. This operation is performed by ultrasounds applied along their length direction, by cooperation between the horn cutter unit 42 and anvil blade unit 45.

The flat cable 61 thus produced is passed through the guide rollers 58a and 58b and the second guide roller 59, and continuously taken up by the take-up roll 62.

As mentioned above, the ultrasonic welding and ultrasonic cutting of the insulator films 35a and 35b are both performed at one stage in an ultrasonic welding and cutting device 37. By virtue of such an ultrasonic cutting method, the insulator films 35a and 35b are efficiently prevented from deviating off the product flow line P. Moreover, in the above method, the ultrasonic cutting of the insulator films 35a and 35b can be performed immediately after the ultrasonic welding, with no recourse to cooling. This enables cutting of the width margin with high precision, increase of the cutting speed, and improved productivity.

As the insulator films 35a and 35b are cut by ultrasonic melting, the cut faces of the insulator films 35a and 35b are immediately fused and adhered to each other. The flat cable 61 thus obtained has a firmly sealed side rims.

Further, the anvil melter unit 44 and anvil cylinder unit 50 are designed to have the same structure, and are provided respectively upstream and downstream of the anvil blade unit 45 in a sequential relation. In such a production line, each wire conductor 31 is guided conveniently by each conductor-path groove 49 of the anvil melter unit 44 and a corresponding groove 51 of the anvil cylinder unit 50, so that the insulator films 35a and 35b are efficiently prevented from widthwise deviation. This also contributes to high precision width-margin cutting achieved by the anvil blade unit 45.

Furthermore, when the anvil melter unit 44 is worn, it can be exchanged with the anvil cylinder unit 50 as a provisional measure prior to the replacement.

The horn cutter unit 42 has an arc shape projecting towards the anvil 39. This configuration allows to avoid generating unnecessary heat during the ultrasonic welding.

The horn cutter unit 42 is provided with ceramic chips on the surface facing the anvil unit 39. Such a construction allows to reduce efficiently the wearing of the horn cutter unit 42, caused by the contact with the anvil blade unit 45.

As the anvil melter unit 44 is held in a freely rotatable way, it is rotated by entrainment when the insulator films 35a and 35b are forwarded while ultrasonically welded. Thus, the welding is always effected using a new surface. Alternatively, the anvil melter unit 44 may be mounted fixedly. Then, when damage such as breaking and cut-out is caused, the anvil melter unit 44 is rotated by a given angle and mounted again, so that the welding is effected always on a new surface.

Further, each of the anvil blade units 45 can be mounted by merely inserting it between a conductor-path groove 49 of the anvil melter unit 44 and a corresponding groove 51 of the anvil cylinder unit 50. Its position can thus be exchanged easily with another. The number of anvil blade units 45 contained in one ultrasonic welding and cutting device 37 can be chosen freely to suit requirements.

The air pressure of the air cylinder 53 can be adjusted such as to regulate the contact pressure and optimize the ultrasonic welding.

In the above embodiment, the conductor-path grooves 49 are formed in the anvil melter units 44. However, such grooves may also be formed in the horn melter unit 41.

Likewise, in the above embodiment, the insulator films 35a and 35b are provided with a thin adhesion layer. Optionally, this thin layer may be obviated. Then, the preliminary adhesion process by the hot rolls 34a and 34b is not used.

In such a case, the insulator films 35a and 35b as such become less expensive, and their production costs can also be reduced. Further, the relevant parts of the production line can be dismantled more easily, without risking impurity contamination, so that the recycling rate can be improved.

In the above embodiment, the flat cable 61 includes five conductor elements (wire conductors 31). However, the flat cable 61 may include fewer than 5, or more than 5, conductor elements, without any specific limitation as to their number.

In the above embodiment, an air cylinder 53 is used as contact pressure regulating mechanism. Alternatively, the height of the anvil blade unit 45 or contact pressure may be regulated by screw or spring devices. Such means are not specifically limited.

According to the flat-cable manufacturing system of the invention, the surface for imparting ultrasonic oscillations includes a horn melter unit located upstream, and separately a horn cutter unit located downstream.

The anvil unit includes an anvil melter unit corresponding to the horn melter unit, and an anvil blade unit corresponding to horn cutter unit.

Further, at least the anvil melter unit includes a surface opposed to the horn melter unit, and the surface contains a plurality of conductor-path grooves, such that, when the horn melter unit is moved closer to the anvil melter unit, the elongate conductors are passed through the spaces formed by the conductor-path grooves at a given interval, and when the insulator films are fused and welded ultrasonically in the above closely moved state, the horn cutter unit and the anvil blade unit are placed into contact, such that the ultrasonically welded insulator films can be cut off ultrasonically.

The insulator films are thus ultrasonically fused and welded, and ultrasonically fused and cut off, at the same stage of the production. In particular, an ultrasonic cutting method is adopted as cutting mechanism, so that the insulator films are prevented from deviating off the product flow line during the product-forwarding. Moreover, the operations of successive ultrasonic welding and cutting of the insulator films can be effected without cooling. This results in a high-precision width-margin cutting, a high-speed cutting and a better productivity.

As the insulator films are fused and cut by ultrasounds, the cut faces of the insulator films are adhered to each other at the same time as the cutting operation. The longitudinal rims of the insulator films are thus sealed firmly.

Further, the anvil melter unit is in the form of a cylinder and a plurality of conductor-path grooves are formed on the external circular face of the cylinder.

The anvil unit further includes a grooved anvil cylinder unit having the same structural configuration as the anvil melter unit, and the grooved anvil cylinder unit is located downstream of the anvil melter unit and anvil blade unit in the sequential order on the product flow line.

Further, the anvil blade unit can be freely fitted into, or removed from, the space between a conductor-path groove of the anvil melter unit and the corresponding groove of the grooved anvil cylinder unit, and held therebetween.

During the flat cable production, each wire conductor is guided by the conductor-path groove of the anvil melter unit and groove of the anvil cylinder unit, so that the insulator films are prevented from widthwise deviation. This also contributes to a high-precision cutting of the width margin. Furthermore, as mentioned above, when the anvil melter unit wears, the anvil melter unit and the anvil cylinder unit may be exchanged as a provisional replacement measure.

Further, not only the anvil blade units can be fitted easily between the conductor-path grooves of the anvil melter unit and the grooves of the anvil cylinder unit, but also their positions can easily be exchanged to one another.

Further yet, the horn melter unit may have an arc-shaped form projecting towards said anvil melter unit. Such an arcuate form prevents unnecessary heat generation upon ultrasonic welding.

The horn cutter unit may have a surface facing the anvil cutting-blade unit, and the surface is provided with ceramic chips. Wearing can thus be prevented.

As the anvil cutting-blade unit may have a contact pressure against the horn cutter unit and a regulating mechanism regulates the contact pressure, the ultrasonic melting and cutting can be effected very properly.

Although the invention has been described with reference to particular means, materials and embodiments, it is to be understood that the invention is not limited to the particulars disclosed and extends to all equivalents within the scope of the claims.

The present disclosure relates to subject matter contained in priority Japanese Application No. 2001-187750, filed on Jun. 21, 2001, which is herein expressly incorporated by reference in its entirety.

What is claimed:

1. An ultrasonic welding and cutting device for use in the manufacture of a flat-cable, the flat cable including a plurality of wire conductors which are arranged in parallel at a given interval with respect to each other and interposed between first and second insulator films, said device having a product flow line in an upstream to downstream direction, and comprising:

a horn unit that imparts ultrasonic oscillations, said horn unit comprising a horn melter unit and a horn cutter unit, said horn melter unit and said horn cutter unit being located sequentially from upstream to downstream at a predetermined distance along said product flow line; and an anvil unit including an anvil melter unit and at least one anvil blade unit, said anvil melter unit and said at least one anvil blade unit respectively facing said horn melter unit and said horn cutter unit along said product flow line;

such that, when said first and second insulator films containing said plurality of wire conductors are passed between said horn and anvil units, said first and second insulator films can be fused and adhered by said horn and anvil melter units, and successively fused and cut or trimmed by said horn cutter unit and said at least one anvil blade unit, respectively along said product flow line.

2. The ultrasonic welding and cutting device according to claim 1, wherein said anvil melter unit and horn melter unit have respective surfaces facing each other, and at least one of said surfaces includes a plurality of conductor-path grooves formed to correspond to said plurality of wire conductors, such that, when said horn melter unit is moved closer to said anvil melter unit, said wire conductors are placed in said conductor-path grooves, and such that, while an upstream portion of said first and second insulator films is ultrasonically fused and welded, said horn cutter unit and said at least one anvil blade unit are placed into contact and a downstream portion of ultrasonically welded first and second insulator films is ultrasonically cut off.

3. The ultrasonic welding and cutting device according to claim 2, wherein said anvil melter unit has a cylindrical form with a circular surface, and said conductor-path grooves are formed on said circular surface.

4. The ultrasonic welding and cutting device according to claim 3, wherein said device further comprises an anvil cylinder unit having grooves, said anvil cylinder unit having the same configuration as that of said anvil melter unit and is placed downstream of said at least one anvil blade unit along said product flow line.

5. The ultrasonic welding and cutting device according to claim 4, wherein each of said anvil blade unit(s) has a configuration such that it can be freely fitted into, or removed from, the space formed between a conductor-path groove of said anvil melter unit and the corresponding groove of said anvil cylinder unit, and held therebetween.

6. The ultrasonic welding and cutting device according to claim 1, wherein said horn melter unit has an arc-shaped form projecting towards said anvil melter unit.

7. The ultrasonic welding and cutting device according to claim 1, wherein said horn cutter unit has a surface facing said at least one anvil blade unit, and said surface is provided with ceramic chips.

8. The ultrasonic welding and cutting device according to claim 1, wherein said device further comprises a regulating mechanism that regulates a contact pressure of said at least one anvil blade unit against said horn cutter unit.

9. A system for manufacturing a flat cable, said system having a product flow line in an upstream to downstream direction, and comprising:

mechanism that arranges a plurality of wire conductors in parallel at a given interval to each other;

mechanism that interposes said wire conductors between first and second insulator films;

such that said first and second insulator films face each other at said given interval between said wire conductors; and an ultrasonic welding and cutting mechanism comprising:
a horn unit that imparts ultrasonic oscillations, said horn unit comprising a horn melter unit and a horn cutter unit, said horn melter unit and said horn cutter unit being located sequentially from upstream to downstream at a predetermined distance along said product flow line; and an anvil unit including an anvil melter unit and at least one anvil blade unit, said anvil melter unit and said at least one anvil blade unit respectively facing said horn melter unit and said horn cutter unit along said product flow line;

such that, when said first and second insulator films containing said plurality of wire conductors are passed between said horn and anvil units, said first and second insulator films can be fused and adhered by said horn and anvil melter units, and successively fused and cut or trimmed by said horn cutter unit and at least one anvil blade unit, respectively along said product flow line.

10. A system for manufacturing a flat cable according to claim 9, wherein said system further comprises mechanism that provides adhesion layers to said first and second insulator films upstream of said ultrasonic welding and cutting mechanism, said adhesion layers being supplied on that surface of each of said first and second insulator films which faces said wire conductors.

11. A method for manufacturing a flat cable having a product flow line in an upstream to downstream direction, and comprising:

arranging a plurality of wire conductors in parallel at a given interval to each other;

interposing said wire conductors between first and second insulator films, whereby said first and second insulator films face each other at said given interval between said wire conductors; and ultrasonically welding and cutting said first and second insulator films by using:

a horn unit that imparts ultrasonic oscillations comprising a horn melter unit and a horn cutter unit, said horn melter unit and said horn cutter unit being located sequentially from upstream to downstream at a predetermined distance along said product flow line; and an anvil unit comprising an anvil melter unit and at least one anvil blade unit, said anvil melter unit and said at least one anvil blade unit respectively facing said horn melter unit and said horn cutter unit along said product flow line;

whereby, when said first and second insulator films containing said plurality of wire conductors are passed between said horn and anvil units, said first and second insulator films can be fused and adhered by said horn and anvil melter units, and successively fused and cut or trimmed by said horn cutter unit and said at least one anvil blade unit, respectively along said product flow line.

* * * * *